(12) United States Patent
Jolfaei

(10) Patent No.: US 8,706,844 B2
(45) Date of Patent: Apr. 22, 2014

(54) PROVISION OF TROUBLESHOOTING TOOLS IN A NETWORK SYSTEM

(75) Inventor: Masoud Aghadavoodi Jolfaei, Wiesloch (DE)

(73) Assignee: SAP AG, Walldorf (DE)

( * ) Notice: Subject to any disclaimer, the term of this patent is extended or adjusted under 35 U.S.C. 154(b) by 639 days.

(21) Appl. No.: 12/629,833

(22) Filed: Dec. 2, 2009

(65) Prior Publication Data
US 2011/0131295 A1 Jun. 2, 2011

(51) Int. Cl.
*G06F 11/07* (2006.01)
*G06F 15/16* (2006.01)

(52) U.S. Cl.
USPC .............................. 709/219; 709/203; 714/25

(58) Field of Classification Search
USPC ......... 709/219, 201, 202, 203, 224, 226, 227; 717/103, 124, 127, 130; 714/1, 25, 40, 714/43, 31, 38.1
See application file for complete search history.

(56) References Cited

U.S. PATENT DOCUMENTS

| 6,748,380 | B2 * | 6/2004 | Poole et al. | 717/174 |
|---|---|---|---|---|
| 6,751,654 | B2 * | 6/2004 | Massarani et al. | 709/219 |
| 7,185,319 | B2 * | 2/2007 | Kaler et al. | 717/124 |
| 7,685,289 | B2 * | 3/2010 | Burckart et al. | 709/227 |
| 2005/0138113 | A1 * | 6/2005 | Brendle et al. | 709/203 |
| 2005/0172168 | A1 * | 8/2005 | Kilian | 714/31 |

OTHER PUBLICATIONS

Bruce, Web Request Source IP Addresses, Mar. 5, 2003, discountASP.net Community Forum, community.discountasp.net/showthread.php?t=39.*

* cited by examiner

*Primary Examiner* — Ruolei Zong
(74) *Attorney, Agent, or Firm* — Schwegman, Lundberg & Woessner, P.A.

(57) ABSTRACT

In an embodiment, a method is provided for providing a tool used for troubleshooting a component. This tool is included in an application server that is in communication with multiple client computing devices. Here, a request to activate the tool is received from one or more client computing devices. This request includes a diagnostic identifier that uniquely identifies the client computing device that transmitted the request. Upon receipt of the request, the tool is activated at the application server with the diagnostic identifier used as an input parameter. When activated, the tool can identify the client computing device based on the diagnostic identifier and can provide a functionality associated with the troubleshooting to the client computing device.

20 Claims, 11 Drawing Sheets

FIG. 4

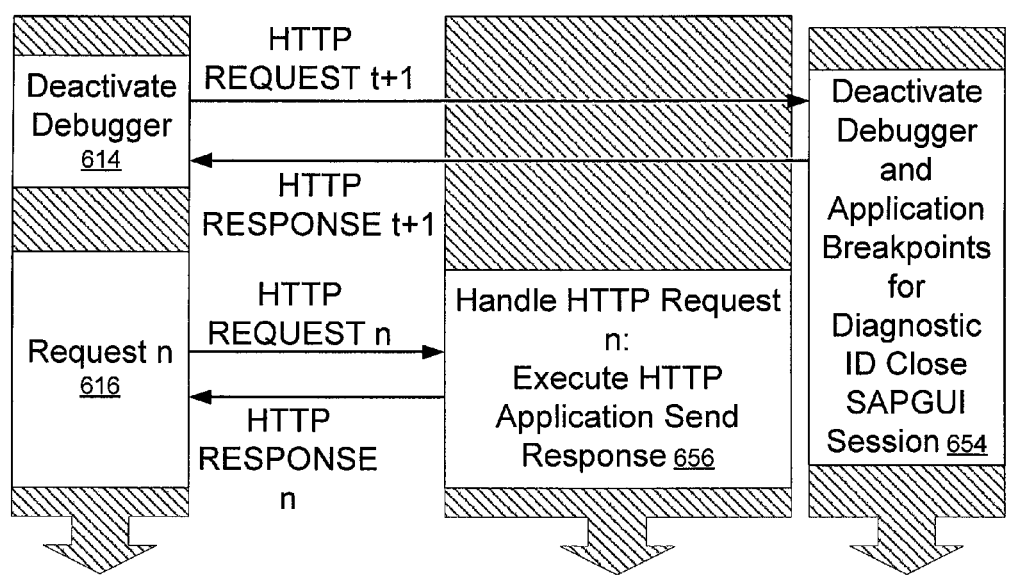
FIG. 6 (conclusion)

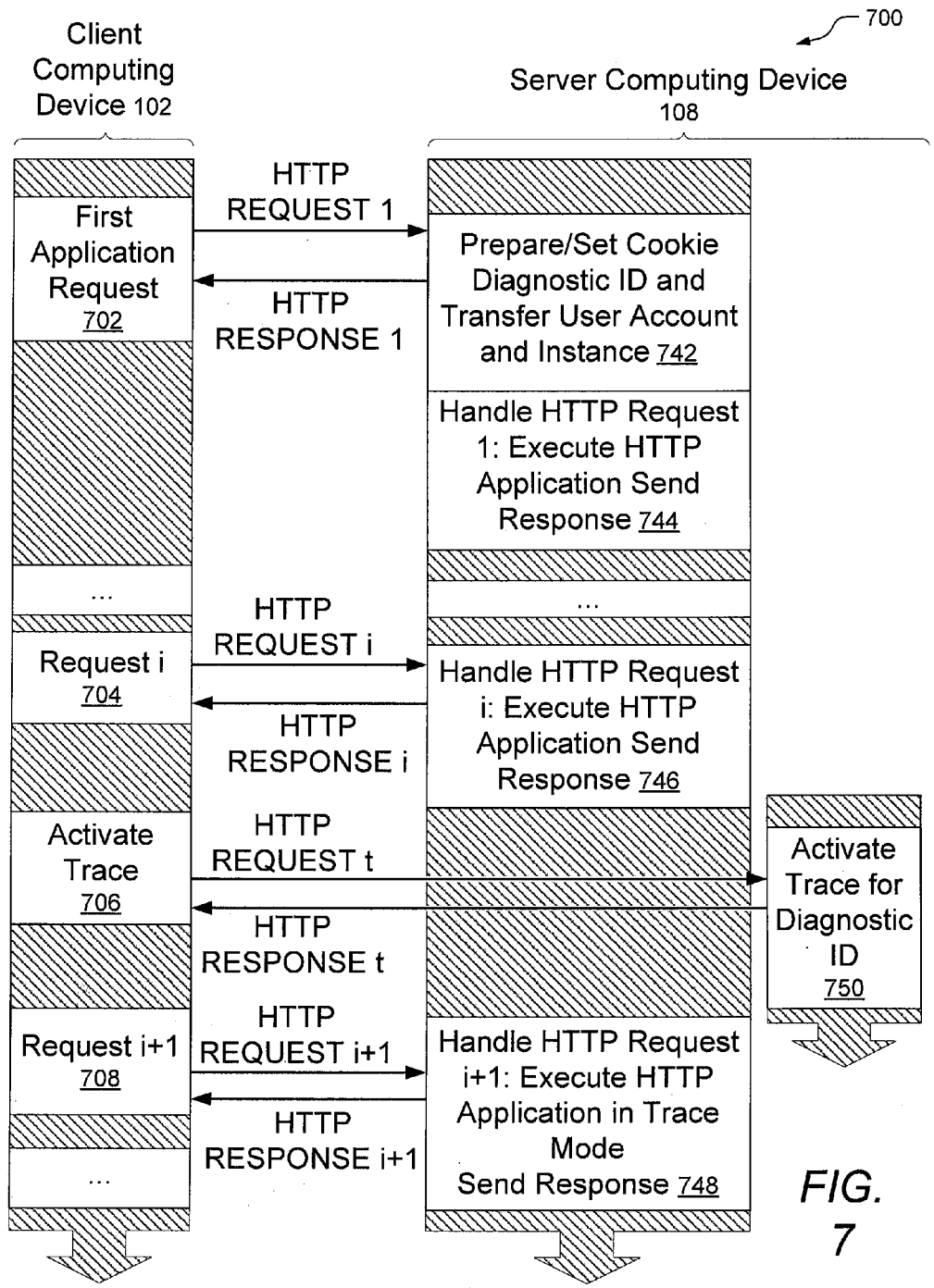

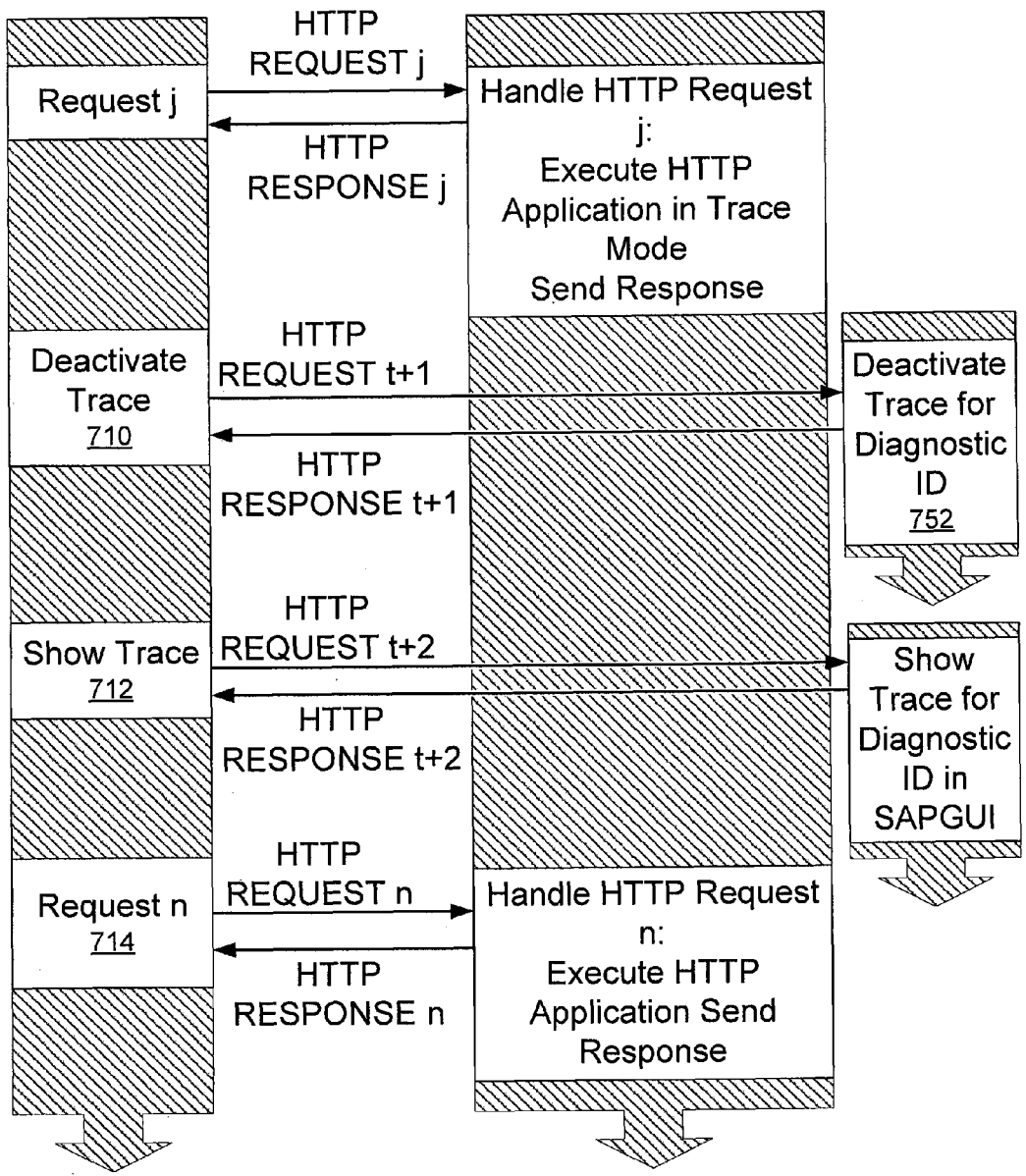
*FIG. 7 (conclusion)*

PROVISION OF TROUBLESHOOTING TOOLS IN A NETWORK SYSTEM

COPYRIGHT

A portion of the disclosure of this document may include material that is subject to copyright protection. The copyright owner has no objection to the facsimile reproduction, by anyone, of the patent document or the patent disclosure, as it appears in the Patent and Trademark Office patent files or records, but otherwise reserves all copyright rights whatsoever. The following notice applies to the software, data, and/or screenshots that may be illustrated below and in the drawings that form a part of this document. Copyright© 2009, SAP AG. All Rights Reserved.

FIELD

The present disclosure relates generally to troubleshooting software and hardware components. In an embodiment, the disclosure relates to the provision of troubleshooting tools in a network system.

BACKGROUND

Software and hardware components can often have errors that produce incorrect or unexpected results, or cause the components to behave in unintended ways. Debugging is a process of finding and correcting the errors, and currently, a large number of troubleshooting applications may be used to "debug" errors. Many troubleshooting applications in a network system may be used to debug errors occurring at different systems (e.g., at server). However, such use of troubleshooting applications in a large network system may not be possible because, in some network systems, the devices cannot be directly identified. Identification may not be possible given that many applications run in a portal environment or the applications are not connected directly with other devices or systems.

BRIEF DESCRIPTION OF DRAWINGS

The present disclosure is illustrated by way of example and not limitation in the figures of the accompanying drawings, in which like references indicate similar elements and in which:

FIG. 4 depicts a user interface diagram, in accordance with an example embodiment, illustrating a technique for activating a troubleshooting tool;

FIG. 7 depicts a flow diagram of a detailed method, in accordance with an example embodiment, for activating and deactivating a tracing tool.

DETAILED DESCRIPTION

The description that follows includes illustrative systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

Embodiments of the present invention provide a unified troubleshooting framework for activation and deactivation of troubleshooting infrastructures. In this framework, a user using a computing device can troubleshoot any suitable software and/or hardware error occurring at another computing device (e.g., a server) by activating tools used for troubleshooting components. As described in more detail below, these tools are hosted at a server and each tool can be activated with a diagnostic identifier used as an input parameter.

Figure 1:
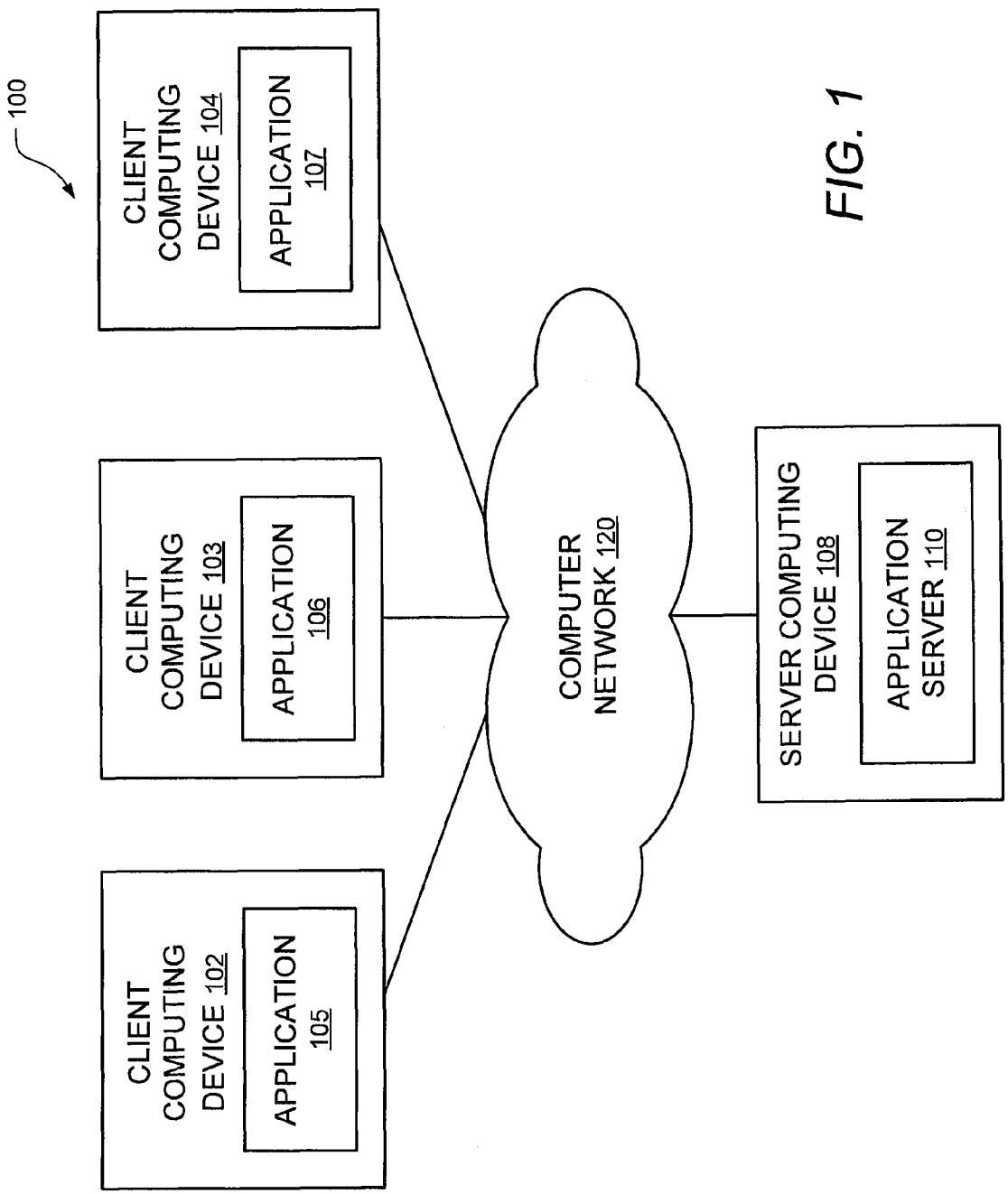
FIG. 1 depicts a block diagram of a network system, consistent with an example embodiment, for providing one or more tools used for troubleshooting applications.

FIG. 1 depicts a block diagram of a network system 100, consistent with an example embodiment, for providing one or more tools used for troubleshooting applications. The network system 100 includes multiple client computing devices 102-104 that are in communication with a server computing device 108 by way of a computer network 120. Each client computing device 102, 103, or 104 can access a remote service on the server computing device 108 by way of the computer network 120, which is a collection of interconnected computing devices that communicate utilizing wired or wireless mediums. Examples of computer networks include Local Area Networks (LANs) and/or Wide Area Networks (WANs), such as the Internet.

The client computing devices 102-104 are configured to run a variety of different applications 105-107, including Web browsers, business related applications (e.g., accounting applications, reporting applications, customer information management applications, and sales order applications), ADOBE Flash, MICROSOFT Silverlight, SAP Business Client, and other applications. The server computing device 108 is configured to host an application server 110, which is dedicated to run specific applications and delivers these applications to the client computing devices 102-104. The application server 110 may handle, for example, business logic and data access requests from the applications 105-107. Examples of application servers, such as application server 110, include SAP NetWeaver Application Server, Advanced Business Application Programming (ABAP) Application Server, and Java Platform Enterprise Edition Server.

Defects or faults may exist in the software or hardware components of the network system 100. The server computing device 108 includes an infrastructure that provides various functionalities to the client computing devices 102-104 for troubleshooting the components of the network system 100. In this infrastructure, the troubleshooting functionalities are hosted by the application server 110. As a result, as explained in more detail below, users at the client computing devices 102-104 may troubleshoot components of the network system 100 by accessing various troubleshooting functionalities provided by the server computing device 108 through the use of, for example, a Web browser.

Figure 2:
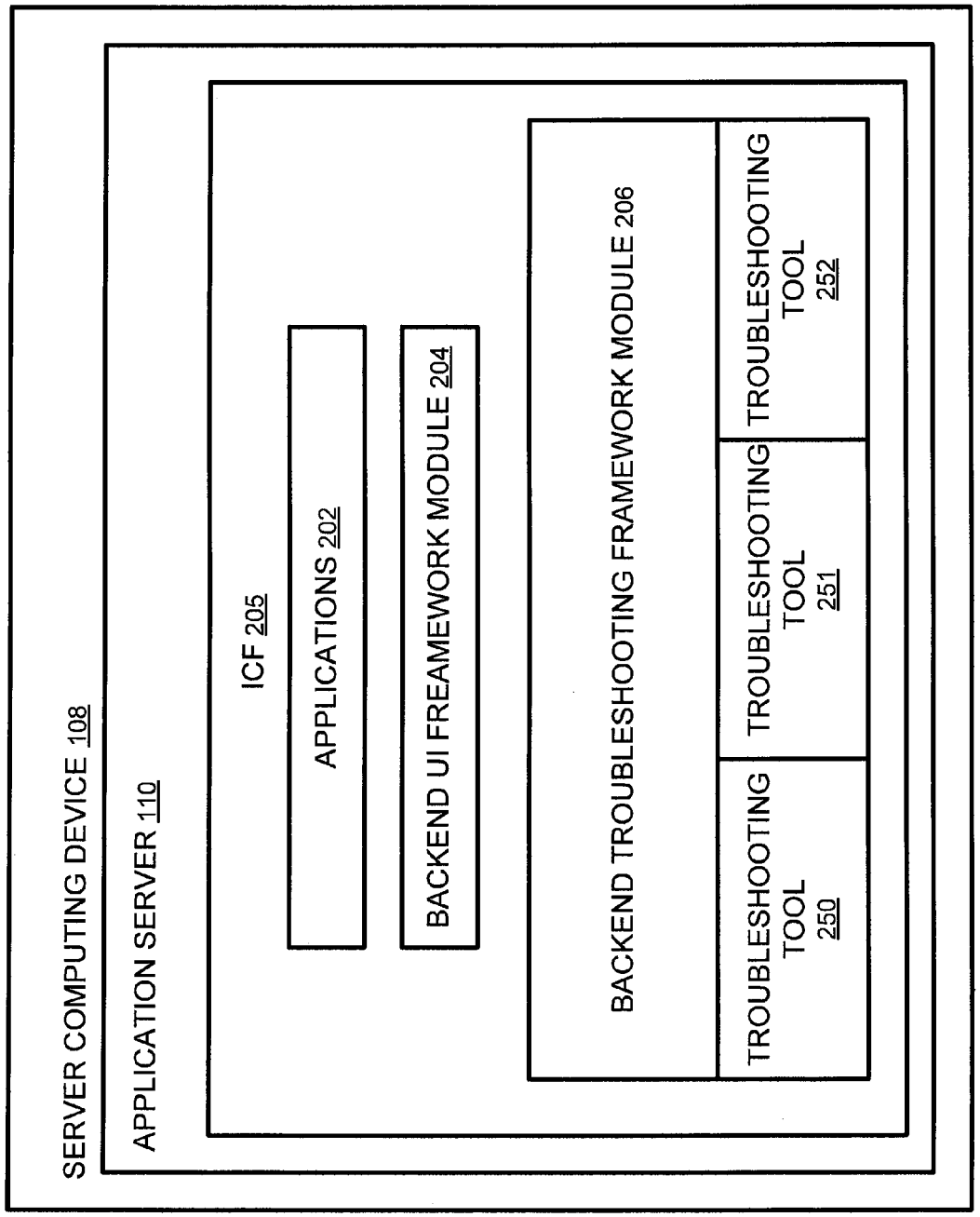
FIG. 2 depicts a block diagram of the various modules, consistent with an example embodiment, that are included in a server computing device.

FIG. 2 depicts a block diagram of the various modules, consistent with an example embodiment, that are included in a server computing device 108. It should be appreciated that the server computing device 108 may be deployed in the form of a Web server, an application server, or other servers, and, as an example, may form a part of the network system 100 depicted in FIG. 1. In various embodiments, the server computing device 108 may be used to implement computer programs, logic, applications, methods, processes, or software to provide tools used for troubleshooting hardware or software components, as described in more detail below.

In the example depicted in FIG. 2, the server computing device 108 is adapted to host the application server 110. The application server 110 can serve a variety of different processes and/or services executing on the server computing device 108. These software processes and/or services may include, for example, an Internet communication framework (ICF) 205. The ICF 205 generally handles communication to and from other computing devices by way of Hypertext Transfer Protocol (HTTP), Hypertext Transfer Protocol Secure (HTTPS), Simple Mail Transfer Protocol (SMTP), and/or other communication protocols. For example, at a Netweaver ABAP Application Server, the ICF 205 can be a part of a communication layer that provides client and server side communication on top of the HTTP/HTTPS/SMTP protocol. This ICF 205, in one embodiment, includes various Web applications 202, a backend user interface framework module 204, a backend troubleshooting framework module 206, and various troubleshooting tools 250-252.

The backend user interface framework module 204 is adapted for providing, serving, and/or rendering user interfaces of Web applications 202 and other applications, such as backend troubleshooting framework module 206 and troubleshooting tools 250-252, to client computing devices. Examples of the backend user interface framework module 204 include Web Dynpro and Flash media server (for use with ADOBE flash).

The backend troubleshooting framework module 206 can be partially integrated in the ICF 205 to provide troubleshooting functionalities, and is adapted to interface with multiple troubleshooting tools 250-252. A "troubleshooting tool," as used herein, is an application that provides functionalities for use in diagnosing and resolving hardware and/or software problems. An example of a troubleshooting tool is a debugger tool, which is an application used to test and debug software and/or hardware components. Such a debugger tool may, for example, provide a display of the contents of a computer memory, including source code and variables. Another example of a troubleshooting tool is a memory analyzer that can analyze or check allocated memories during execution. Yet another example of a troubleshooting tool is a tracing tool, which may often be included in the debugger tool, that provides functionalities such as setting conditional breakpoints, specifying debugging exceptions, and performing class trace generation. It should be noted that the tracing tool may include a functional trace and a performance trace. A functional trace dumps or provides information regarding the execution of certain functionalities in a kernel or ABAP. A performance trace, on the other hand, delivers information regarding time consumptions or measurements during execution. Other examples of troubleshooting tools include network route tracers, security monitors, performance monitors, configuration monitors, and other troubleshooting tools. In one embodiment, the trouble shooting tool may be a plug-in application, which is a computer program that interacts with a host application (e.g., backend troubleshooting framework module 206) to provide certain functionalities (e.g. troubleshooting functionalities). It should be noted that a "troubleshooting tool" can also be referred to as a "tool" and accordingly, the terms "troubleshooting tool" and "tool" may be used interchangeably.

Client computing devices in communication with the server computing device 108 may access the functionalities provided by each troubleshooting tool 250, 251, or 252 on demand. As explained in more detail below, the backend troubleshooting framework module 206 can activate and deactivate each troubleshooting tool 250, 251, or 252 upon request by a client computing device. When activated, the troubleshooting tools 250-252 can provide their functionalities through, for example, the backend user interface framework module 204.

It should be appreciated that in other embodiments, the server computing device 108 may include fewer, more, or different modules apart from those shown in FIG. 2. For example, in another embodiment, the application server 110 may include an application programming interface (not shown) rather than the backend user interface framework module 204. Here, the troubleshooting tools 250-252 provide their functionalities by way of the application programming interface. In an alternate embodiment, the backend troubleshooting framework module 206 and the troubleshooting tools 250-252 may not be a part of or included in the ICF 205.

Figure 3:
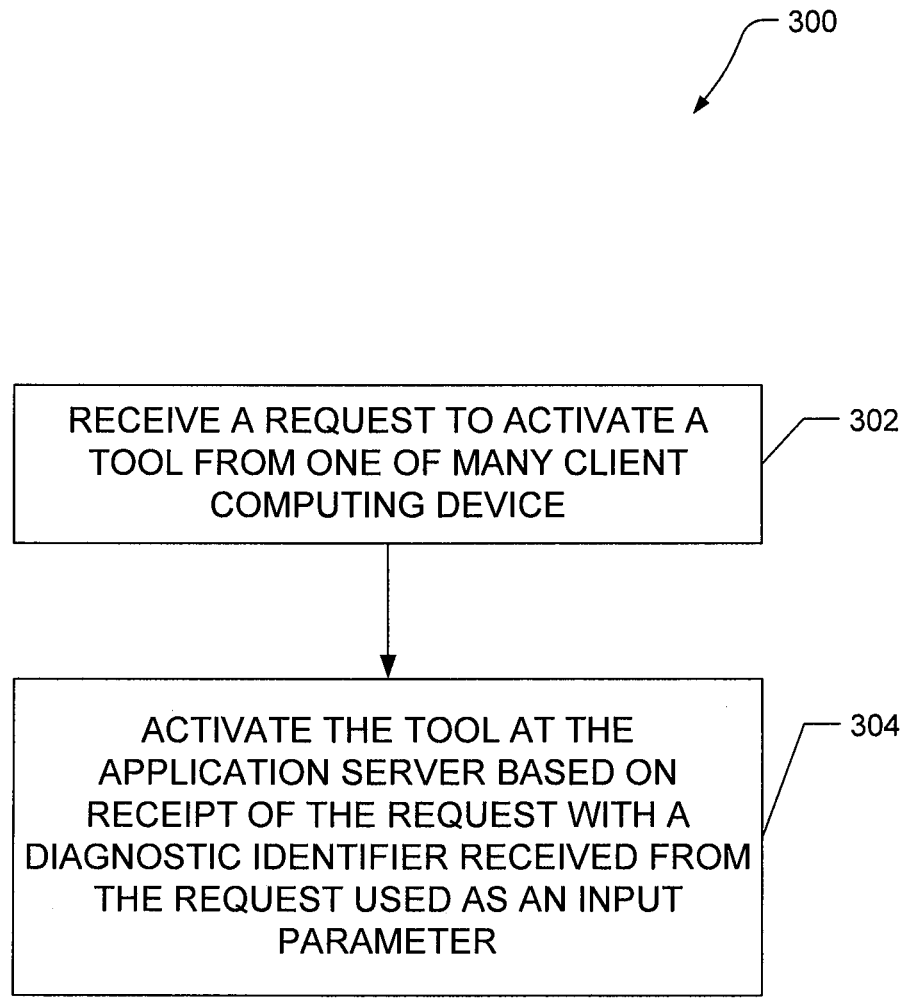
FIG. 3 depicts a flow diagram of a general overview of a method, in accordance with an example embodiment, for providing tools used for troubleshooting software and/or hardware components.

FIG. 3 depicts a flow diagram of a general overview of a method 300, in accordance with an example embodiment, for providing tools used for troubleshooting software and/or hardware components. In an example embodiment, the method 300 may be implemented by the backend troubleshooting framework module 206 and employed in the server computing device 108 of FIG. 2.

As depicted in FIG. 3, a request to activate a troubleshooting tool from one of many client computing devices is received at 302. An example of such a request includes an HTTP request, which is an HTTP message asking for information. Examples of HTTP requests include "GET," "POST," or other requests. In one embodiment, the request includes a diagnostic identifier that uniquely identifies the particular client computing device that transmitted the request. The diagnostic identifier may refer to a Universally Unique Identifier (UUID) or any other suitable variables or values (e.g., alphanumeric characters and symbols) that establish the identity of the client computing device. As explained in more detail below, this diagnostic identifier is used to differentiate or locate the client computing device that transmitted the request from other client devices that did not transmit the same request. In addition to the diagnostic identifier, the request may also include other information used to activate or access the troubleshooting tool at the application server. For example, the request may additionally include logon information, such as username and password, used for log on the application server. As explained in more detail below, the logon information is used to identify whether a user has the permission to activate the troubleshooting tool.

Upon receipt of the request, at 304, the troubleshooting tool specified by the request is activated at the application server with the diagnostic identifier used as an input parameter. As explained in more detail below, the troubleshooting tool may use the diagnostic identifier to identify and locate a particular computing device that transmitted the request, and the troubleshooting tool can provide its functionalities to that client computing device. As a result, for example, a user at a client computing device may use a Web browser to access various troubleshooting functionalities provided by a troubleshooting tool that is hosted at an application server.

Figure 4:
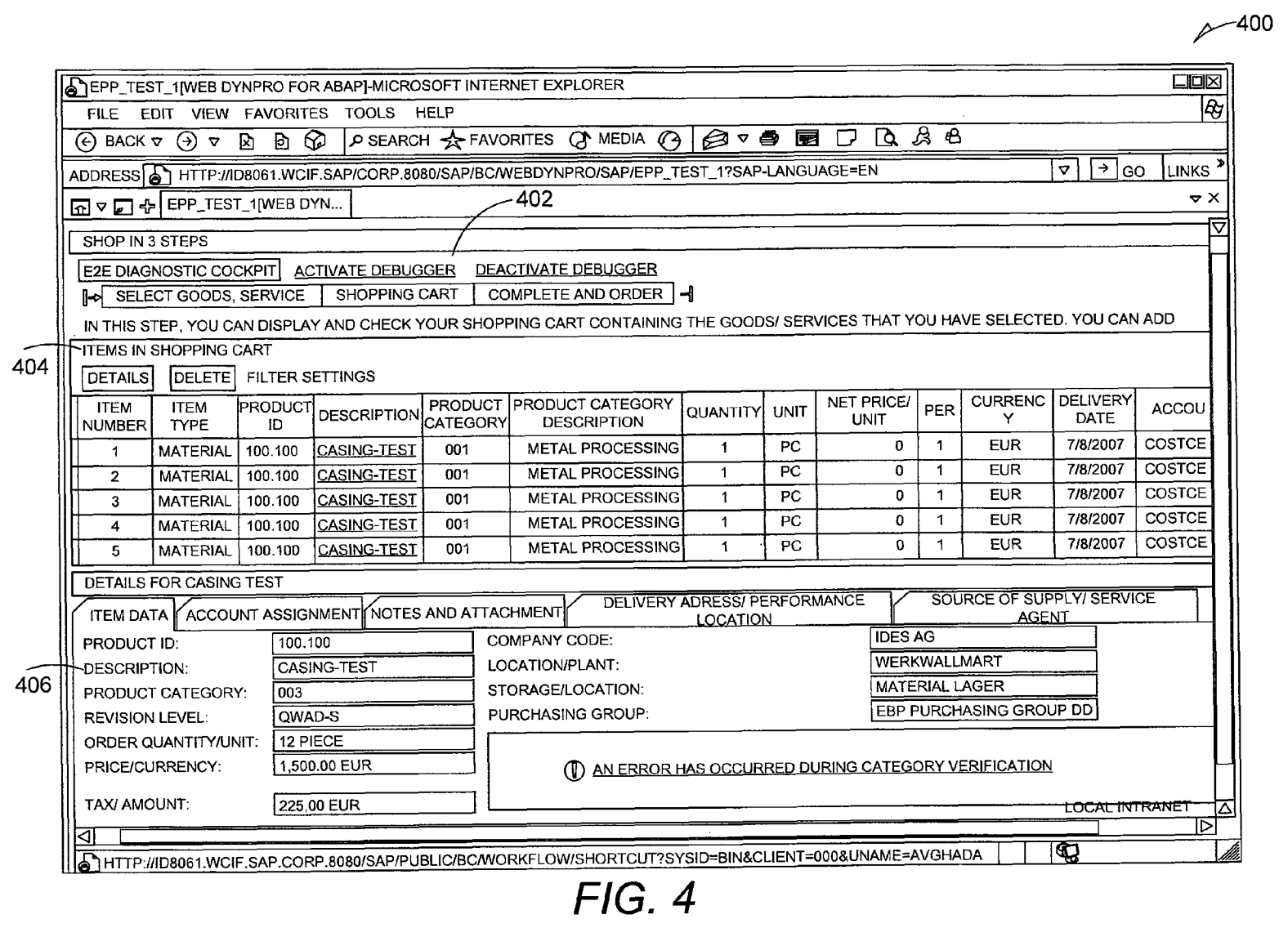

FIG. 4 depicts a user interface diagram, in accordance with an example embodiment, illustrating a technique for activating a troubleshooting tool. The user interface 400 may be displayed by, for example, a browser based application at a client computing device. The user interface 400 includes a debugger link region 402, a main window region 404, and a sub window region 406. In this example, the main window region 404 displays a listing of various items associated with a business transaction. The sub window region 406 provides more information about a particular item selected or highlighted in the main window region 404. In addition to displaying detailed information about a particular item, a user may also edit existing information or input additional information associated with the particular item.

In this example, within the sub window region 406, a user inputs or assigns a product category to an item. Upon input of the product category, the Web browser, for example, transmits a request with the product category to an application server for processing. An inventory accounting application hosted at the application server processes this request and returns an error upon verification of the product category. As an example, this error may have resulted from the user assigning an incorrect or nonexistent product category to the particular item. As a result, an error message is displayed at the sub window region 406.

To diagnose and resolve this error, the user may use a debugger tool. In one embodiment, the debugger tool may be activated by selecting the debugger link region 402. The debugger link region 402 may be a hypertext link that references a particular debugger tool at the application server. The hypertext link can be defined by a uniform resource locator (URL) that identifies or represents the particular debugger tool. Here, the backend troubleshooting framework module 206, for example, may generate this URL at the application server and transmit it to an appropriate application that processes and displays the URL in the form of a hypertext link, such as a Web browser or a Web Dynpro framework. Upon selection of the hypertext link, the Web browser transmits a request to an application server to activate the debugger tool. The hypertext link enables a user who encounters an error to activate the debugger tool on demand by clicking, for example, on this hypertext link (or the debugger link region 402) within the user interface 400. In addition to a hypertext link, the debugger link region 402 may also be in the form of a push button, a list, or other user interfaces.

Figure 5:
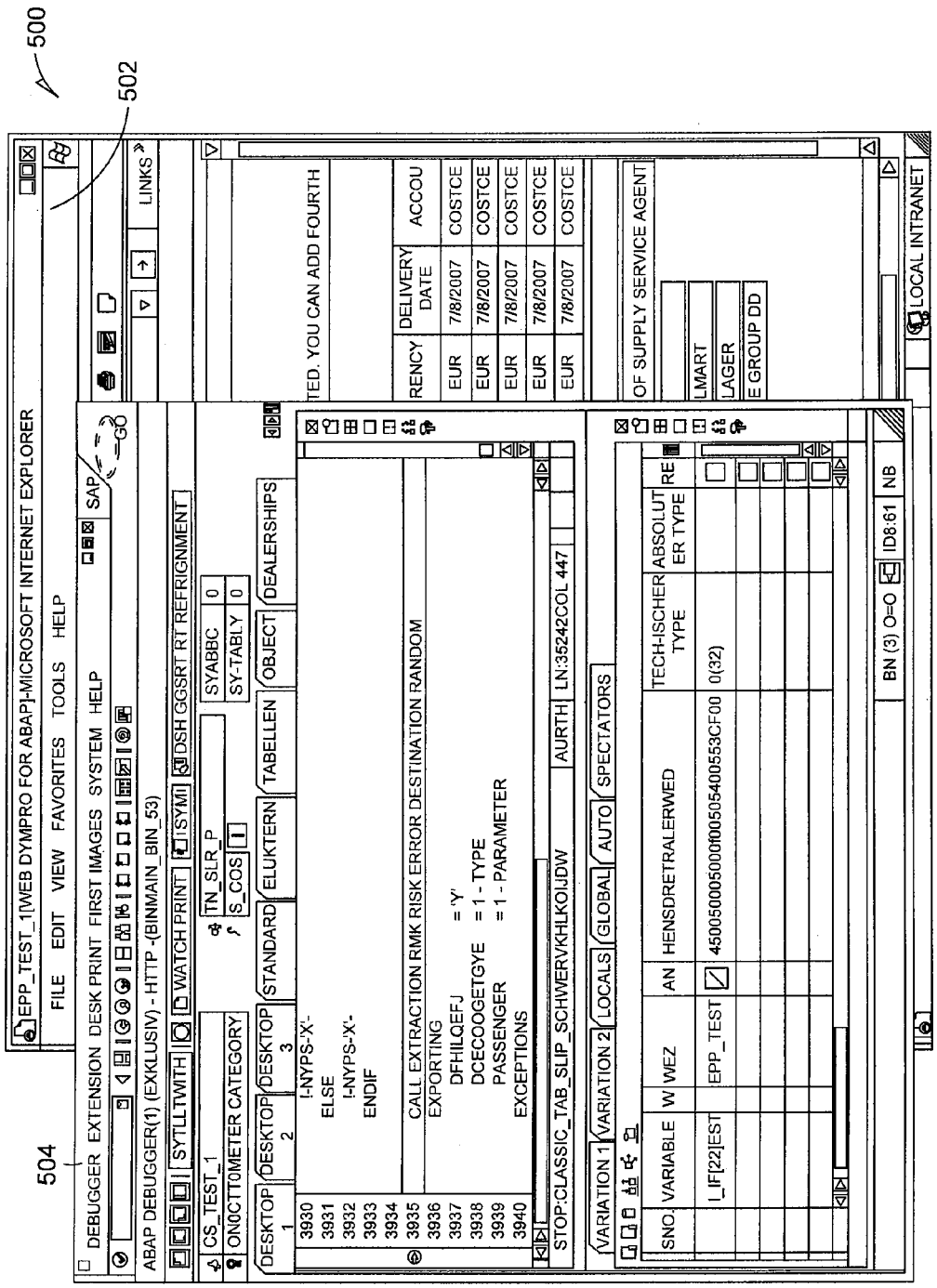
FIG. 5 depicts a user interface diagram, in accordance with an example embodiment, illustrating the activation of a troubleshooting tool at the client computing device.

FIG. 5 depicts a user interface diagram 500, in accordance with an example embodiment, illustrating the activation of a troubleshooting tool at the client computing device. As depicted in FIG. 5, the user interface diagram 500 includes a window region 502 and a pop-up window region 504. As discussed above in FIG. 4, the window region 502 displays a listing of and detailed information about items. Additionally, the window region 502 displays a debugger link region 402 of FIG. 4. As discussed above, a user may select the debugger link region 402 to activate or trigger the provision of a debugger tool.

Returning to FIG. 5, after the user selects the debugger selection region, a pop-up window region 504 is consequently displayed, in accordance with one example embodiment of the invention. This pop-up window region 504 displays a visualization of the functionalities provided by a debugger tool, which is hosted at an application server. The debugger tool may provide a variety of different functionalities that a user may use to test and debug software and/or hardware components. In the example depicted in FIG. 5, the debugger tool allows a user to set breakpoints using the pop-up window region 504 to identify, for example, a location of the error in the source code, as described in more detail below.

Accordingly, instead of having to manually activate a debugger tool, the user can simply click a user interface button, for example, to automatically trigger the activation and provision of troubleshooting functionalities. In addition to providing access to such troubleshooting tools at the client computing device with the use of a browser-based applications, for example, embodiments of the troubleshooting framework may also automate many, if not all manual actions. For example, the troubleshooting framework may provide all necessary information (e.g., target server and business user account) in order to proceed with the appropriate troubleshooting functionality (e.g., functionality provided by debugger tool).

It should be appreciated that a number of suitable layouts can be designed for region layouts illustrated above as FIGS. 4 and 5 do not represent all possible layout options available. The displayable appearance of the regions can be defined by any suitable geometric shape, alphanumeric character, symbol, shading, pattern, and color. Furthermore, for example, the debugger link region 402 depicted in FIG. 4, or any other region, may be omitted or dynamically assigned. It should also be appreciated that the regions can be fixed or customizable. Additionally, the computing devices may have a fixed set of layouts, utilize a defined protocol or language to define the layout, or an external structure can be reported to the computing device that defines the layout. Finally, clicking on the region of graphical user interface as discussed above may trigger code to cause the functionality described herein, such as providing one or more tools for troubleshooting software and/or hardware components.

Figure 6:
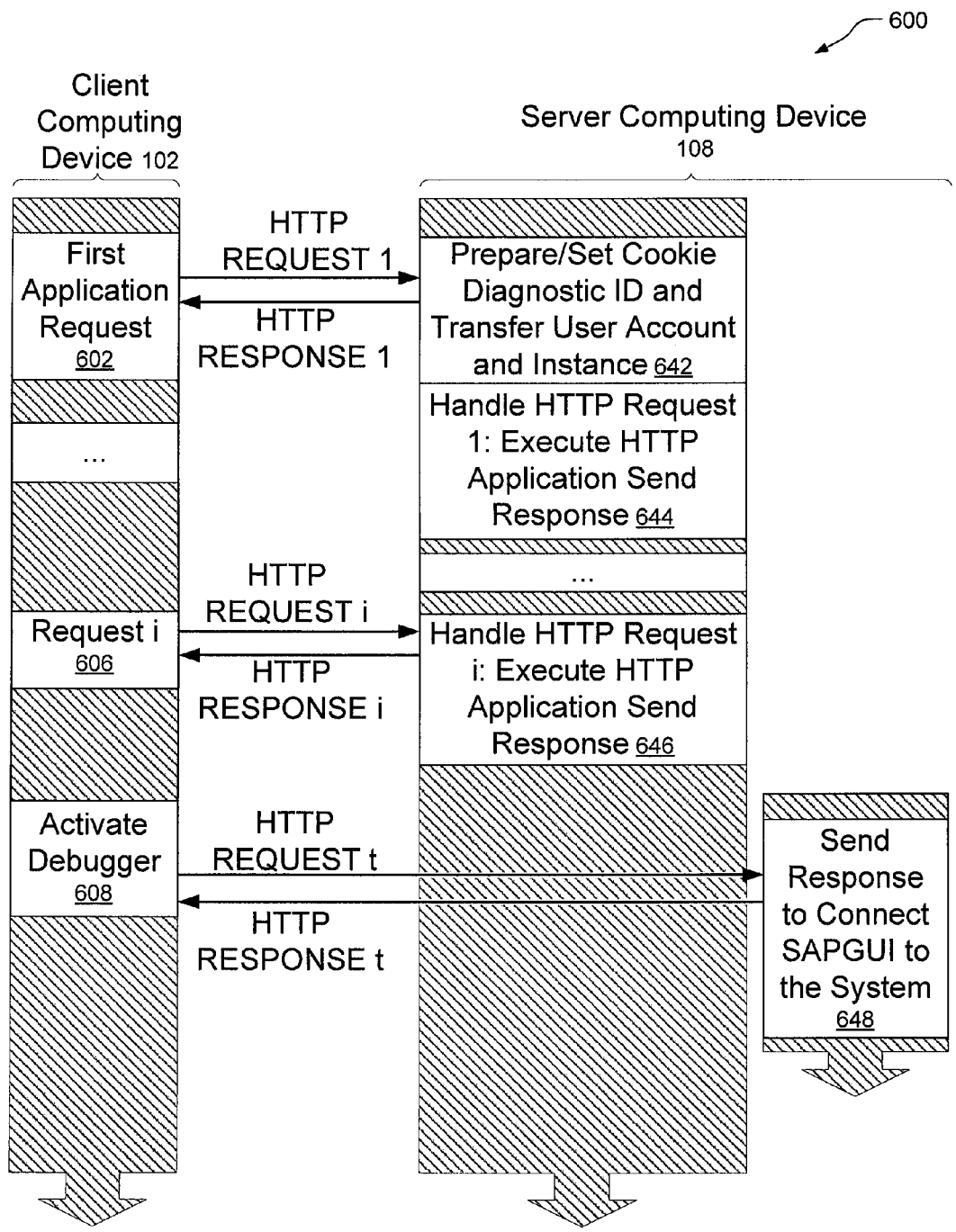
FIG. 6 depicts a flow diagram of a detailed method, in accordance with an example embodiment, for activating and deactivating a debugger tool.
Figure 6:
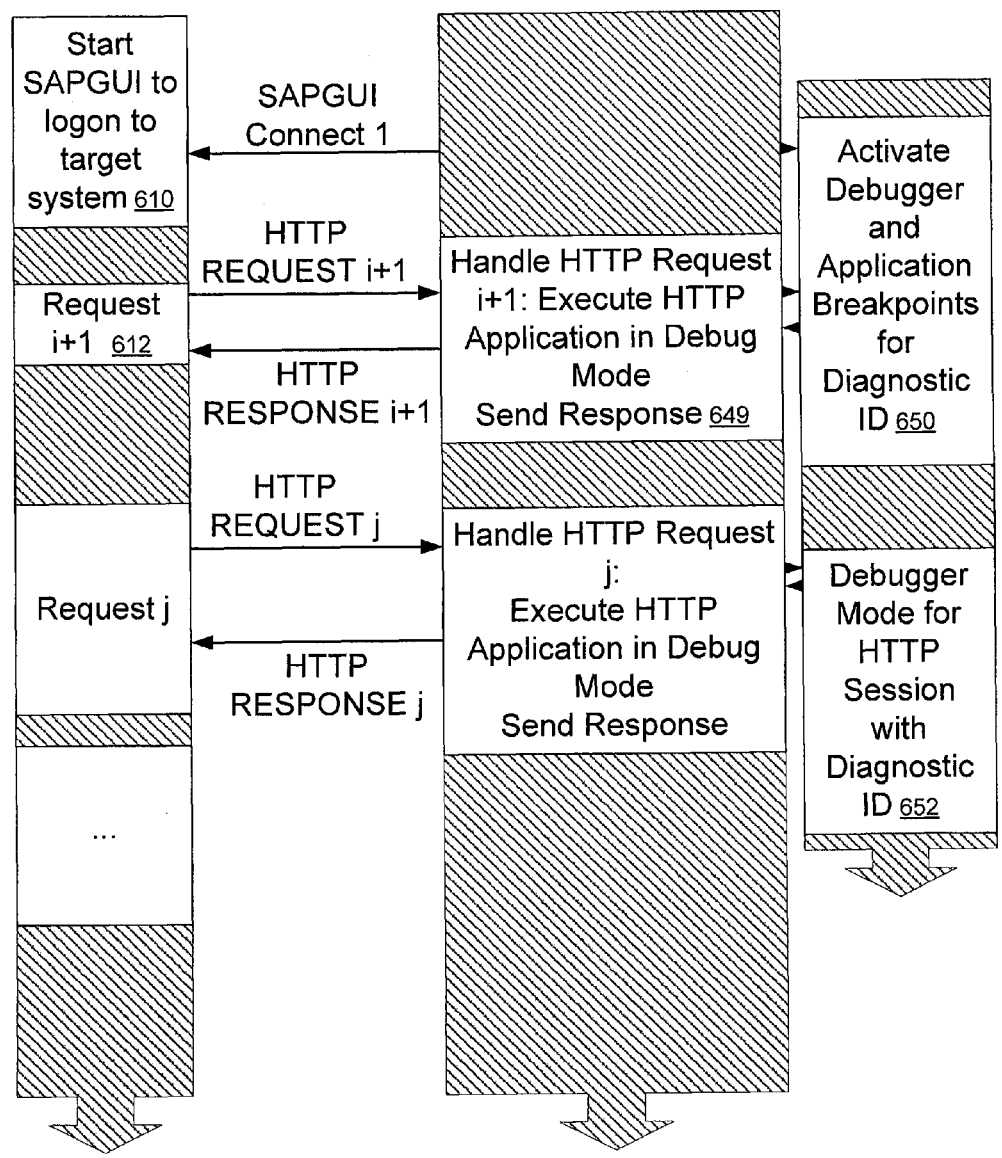

FIG. 6 depicts a flow diagram of a detailed method 600, in accordance with an example embodiment, for activating and deactivating a debugger tool. In this example, the client computing device 102 runs a business application, which is a Web Dynpro-based application that provides graphical user interfaces to access various business-related functionalities in SAP applications hosted at, for example, the server computing device 108. The server computing device 108 hosts an application server that is configured to deliver, in addition to business-related functionalities, a variety of troubleshooting tools to the client computing device 102, one of which is an ABAP debugger tool.

Here, the involved client computing device 102 and a user account are identified such that the business application logon to the target computing device can be triggered. Upon initialization of the business application at the client computing device 102, a first HTTP request (or HTTP request 1) to initialize one or more HTTP-based applications (e.g., Web applications adapted to provide business-related functionalities by way of HTTP messages) may be transmitted at 602 from the client computing device 102 to the server computing device 108. Upon initialization of an application hosted at the server computing device 108, the backend troubleshooting framework module may check whether this first HTTP request includes a diagnostic identifier.

In one embodiment, the diagnostic identifier can be communicated as an HTTP cookie. Here, the first HTTP request may include a cookie field and the diagnostic identifier may be stored or included in this cookie field. For example, the backend troubleshooting framework module may check this first HTTP request for the availability of a cookie with the field name "DIAGNOSTIC_ID." If this cookie field is not available, then a diagnostic identifier may not have been assigned to the client computing device 102. As a result, the backend troubleshooting framework module, at 642, may generate a diagnostic identifier in the form of a UUID, create a new cookie with the field name "DIAGNOSTIC_ID" and with the UUID as a value for the field, and include the field in a first HTTP response (or HTTP response 1). As depicted at 644, the backend troubleshooting framework module then transmits or sends this first HTTP response with the diagnostic identifier along with other information, such as a single sign-on ticket, to the client computing device 102. A single sign-on ticket is used in the authentication procedure, and allows the business application to trigger a separate request that needs logon information. It should be appreciated that the UUID, in the example of stateful HTTP services (e.g., ABAP Web Dynpro), can have the same value as the root context identifier of an existing extended passport [1,2] of a Web Dynpro session.

In an alternate embodiment, the diagnostic identifier may be transmitted to the client computing device 102 as part of an URL. As discussed above, the URL identifies a particular troubleshooting tool, and activation of this URL at the client computing device 102 results in the activation of the particular troubleshooting tool. Here, the backend troubleshooting framework module can generate the diagnostic identifier and encode it into an URL. As an example, the diagnostic identifier can be encoded as ASCII characters within the URL. The backend troubleshooting framework module may then transmit the URL to the client computing device 102 by way of the first HTTP response.

After execution or exchange of several HTTP requests and responses (request i and response i) between the business application and the HTTP-based application at 606 and 646, a user may activate the ABAP debugger tool at 608 from the business application by clicking on, for example, a hypertext link to the ABAP debugger tool. As a result, an HTTP request (HTTP request t) to activate the ABAP debugger tool, as identified by the URL, is transmitted to the server computing device 108. In this example, the URL not only identifies the ABAP debugger tool, but may also include information (e.g., single sign-on ticket) to logon to the application server. A resulting HTTP response (HTTP response t) transmitted at 648 leads to a connection of the business application to the server computing device 108. To initiate a connection of the business application by way of the HTTP response t (in response to HTTP request t), the HTTP response t may include an appropriate "Content-Type," such as "application/x-sapshortcut." This HTTP response t instructs the client computing device 102 to start the execution of an SAPGUI shortcut with the received arguments. It should be appreciated that SAPGUI is a graphical user interface client and the execution of the SAPGUI shortcut can be based on Windows registry technology, where each business application (e.g., SAPGUI.exe) is assigned to a dedicated extension (e.g., ".sap"). Through the "Content-Type," an operating system gets the information about the involved application for consuming the body of the response. That is, the operating system gets information about how a browser-based application, for example, can handle and visualize documents.

In order to establish a secure SAPGUI connection, the SAPGUI shortcut can be used for configuration of the security setting of the communication channel. Here, the user can create the SAPGUI shortcut under a certain identifier, and the security settings can be maintained in the connection settings of the SAPGUI shortcut. If the involved user account does not have the necessary rights for debugging, a user account on demand can be created. This on demand user account has authorizations for setting external breakpoints and debugging the Web Dynpro session, but may have a limited validity time (e.g., two hours). After creation of the user account, an assertion ticket for the user account may be created. With this assertion ticket as an additional assertion ticket parameter for an SAPGUI connection parameter, an appropriate HTTP response t may be generated with the necessary SAPGUI connect parameters in order to enable a logon in the target system with the supplied connection parameters.

Still referring to FIG. 6, after successful logon at 610, the debugger tool is activated at 650 based the diagnostic identifier used as an input parameter. For example, a dedicated ABAP transaction with the diagnostic identifier as input parameter is executed to enable the activation of external break-points for the HTTP requests that include the diagnostic identifier as a cookie. These external break-points can be activated due to a certain external request, such as a Remote Function Call (RFC) request that fulfills a certain criterion. One criterion, for example, can be based on setting external break-points for a certain user. By setting an external break-point for a user, the debugger tool and respective break-points are activated if the external request is processed in an ABAP session under the identity of the user.

It should be appreciated that an ABAP engine supports the technology to set external break-points in an ABAP system (for all application servers belonging to an ABAP system) or for certain terminal identifiers (for request based debugging), which is comparable with diagnostic identifiers. Here, the terminal identifier based external break-points are activated when an external request (e.g., HTTP or RFC request) containing the extended passport is processed. This external request also includes the entry/item terminal identifier as payload. In request-based external debugging, the user may be a virtual user and therefore, may result in many debugger sessions. Accordingly, with external debugging based on diagnostic identifiers, the HTTP runtime, which may include the ICF and backend troubleshooting framework module, can be extended such that the setting of external break-points is based on diagnostic identifiers, which are similar to terminal identifier-based external break-points. In one example, rather than setting terminal identifier-based external break-points, the diagnostic identifier can be set. In this example, the HTTP runtime is extended such that the response extends the cookie diagnostic identifier to an attribute (e.g., debugger=on) when the break-point is activated. By initiating a subsequent request at 612 (e.g., HTTP request i+1), the HTTP runtime evaluates the additional attribute (e.g., debugger=on) of the diagnostic identifier included in an HTTP cookie field. By receiving this attribute, the HTTP runtime feeds the exiting extended password with the item terminal identifier and diagnostic identifier value. Therefore, the existing terminal identifier based debugging can be reused in establishing the debugger tool. Alternatively, instead of setting the terminal identifier in the passport, the activation of the external debugger in ICF, for example, can be based on the cookie field, which includes the diagnostic identifier.

When the debugger tool is activated (or deactivated), a permission check can occur. In one embodiment, the backend troubleshooting framework module checks the required authorities for each troubleshooting tool. If a user account possesses the appropriate rights in his user role, then the particular troubleshooting tool is made available to the user. On the other hand, if a user has the permission to run the backend troubleshooting framework module but does not have SAPGUI logon or even debugging rights, then the backend troubleshooting framework module can request a user account for activation and deactivation of the debugger tool, as discussed above. It should be noted that an SAPGUI logon refers to a logon with a user account that has the rights for SAPGUI interactions.

To possibly reduce the complexity of authorizations in the example where the user does not possess the necessary rights, a reference user account for troubleshooting activities with required authorizations can be maintained in the system, according to an alternative embodiment. During initialization, a check may be conducted to determine whether the user has all the necessary permissions to run the background troubleshooting framework module with the assigned supportability tools, or alternatively has the permission to reuse the maintained reference user's authorities for execution of the background troubleshooting framework module. In the example based on reuse of the permission, a user account with the reference user's permission and limited validity time on demand is generated for the front-end user (as proxy user) to enable, for example, the usage of supportability tools in the context of the backend troubleshooting framework module.

With the execution of the HTTP request i+1 at 649, the HTTP runtime activates the debugger tool for the received diagnostic identifier. The HTTP session then effectively becomes a debuggee while the SAPGUI session becomes a debugger. During the debugger session at 652, the user may then set additional (conditional) break-points (or watchpoints) to direct the debugger tool to particular portions of the source code. The debugger tool would then stop at the particular portions of the source code in order to proceed with the debugging task.

Referring now to 614, the backend troubleshooting framework module may receive a request from a client computing device to deactivate the debugger tool. For example, to stop or deactivate the debugger tool, a user can initiate another HTTP request (HTTP request t+1) to deactivate the debugger tool and optionally to logoff the SAPGUI session. In one embodiment, the same processes for activating the debugger tool may also apply to deactivating the debugger tool at 654 with the exception that the SAPGUI channel is reused to execute a transaction for deactivation of break-points, which were previously set for the diagnostic identifier, and to logout the SAPGUI session. In another embodiment, the break-points can be deactivated from a HTTP session by deleting/deactivating the break-point, which was set for the diagnostic identifier. Furthermore, the SAPGUI session, which is established for the debugger tool, can also be eliminated by calling an appropriate task handler module for elimination of sessions with a certain session identifier. The session identifier of the SAPGUI session is also preserved into a database (e.g., ICF database) with the diagnostic identifier information. As a result, by selecting database for an active debugger breakpoint, the associated SAPGUI session identifier can be identified from the database entry for break-points.

After deactivation of the debugger, subsequent Web Dynpro application requests (e.g., HTTP request n at 616) received at 656 is not processed in the context of the debugger tool, as no debugger entry is found.

FIG. 7 depicts a flow diagram of a detailed method 700, in accordance with an example embodiment, for activating and deactivating a tracing tool. In this example, the client computing device 102 runs a business application, which is a Web Dynpro-based application that provides graphical user interfaces to access various business-related functionalities in SAP applications hosted at, for example, the server computing device 108. The server computing device 108 hosts an application server that is configured to deliver, in addition to business-related functionalities, a variety of troubleshooting tools to the client computing device 102, one of which is a tracing tool.

Here, the involved client computing device 102 and a user account are to be identified such that the business application logon to the target computing device can be triggered. Upon initialization of the business application at the client computing device 102, a first HTTP request (or HTTP request 1) to initialize one or more HTTP-based applications may be transmitted at 702 from the client computing device 102 to the server computing device 108. Upon initialization of an application hosted at the server computing device 108, the backend troubleshooting framework module checks whether this first HTTP request includes a diagnostic identifier. As discussed above, in one embodiment, the diagnostic identifier can be communicated as an HTTP cookie. If not, the backend troubleshooting framework module, at 742, may generate a diagnostic identifier. As depicted at 744, the backend troubleshooting framework module then transmits or sends this first HTTP response with the diagnostic identifier along with other information, such as a single sign-on ticket, to the client computing device 102.

After the backend troubleshooting framework module is initialized, the Web Dynpro application is executed and a response of this Web Dynpro application is extended with various data, which is transmitted to the client computing device 102 by way of the ICF. After transmission and execution of several requests (e.g., HTTP request i) at 704 and 746, the user activates the tracing tool at 706 with the transmission of a request (e.g., HTTP request t) according to, for example, a URL generated by the backend troubleshooting framework module. This HTTP request t results in the activation of the requested tracing tool at 750, which is hosted at the server computing device 108.

With an ABAP engine, the ABAP Runtime Analysis (e.g., Transaction SAT) and functional traces (e.g., ABAP work process traces) can be activated for certain users or HTTP request paths. Information about the user account and involved paths are available after a successful Web Dynpro logon to the system. Therefore, the activation can be initiated in a separate HTTP session. Since the troubleshooting tools (including tracing tool) are integrated in the HTTP request handling, the activation of the ABAP runtime analysis or functional traces can occur with the transmission and execution of the HTTP request i+1 at 708 and 748, respectively.

Once HTTP requests i+1 to HTTP request j have been communicated and processed, the user deactivates the tracing tool at 710 by initiating another HTTP request t+1, which can result in the same processes that have been taken to activate traces, with the exception that that ABAP runtime analysis and functional traces are deactivated. Depending on the activation technique (e.g., users or HTTP request paths), the same user or HTTP request path is used to deactivate the ABAP runtime analysis or functional trace at 752. It should be appreciated that the determination of whether the session is used or not used for activation or deactivation of troubleshooting tools depends on the underlying troubleshooting tools. For example, in ABAP debuggers, the same session is used for activation and deactivation of the ABAP debuggers. However, in tracing tools, the same session may not be used for the activation and deactivation of the tracing tools.

To display and analyze the tracing results at the client computing device 102, the appropriate ABAP transaction for the respective tracing is executed. The respective ABAP transaction can be executed with the use of additional requests (e.g., HTTP request t+2) at 712. In one embodiment, the results can be analyzed with use of a WEBGUI application. Here, a WEBGUI (HTTP) request can be executed to initiate the transaction ATRA_E2E with the proper selection parameters. In an alternate embodiment, the results can be analyzed with the use of an SAPGUI application. Similar to debugging, an SAPGUI connection can be initiated to a new SAPGUI session, and the appropriate transaction is thereafter executed (e.g., the transaction ATRA_E2E with the diagnostic identifier as selection criteria). As discussed above, Web Dynpro applications run in stateful mode and thus, in the initialization, the existing attribute root context identifier can be reused. Here, the root context identifier is available in the extended passport of the Web Dynpro session as proposed value for diagnostic identifier. The same filters that are available in transaction ATRA_E2E can be applied for analyzing a set of ABAP runtime performance traces.

It should be additionally noted that in request-based activation (and deactivation) of tracing tools, some extensions may be used to activate the tracing tools for a range of requests that include the diagnostic identifier as a cookie. With extended passport infrastructure, certain information (e.g., terminal identifier) can be transferred across existing communication channels (e.g., RFC and HTTP). Furthermore, the extended passport can be used similarly for activation of the performance traces (e.g., ABAP runtime analysis and statistic traces). Particularly, the extended passport can be extended to tracing, logging, and other troubleshooting attributes. The tracing attribute may include flags (e.g., performance_trace=on) that indicate on and off (or enable and disable). By adding the extended passport with the diagnostic identifier (similar to terminal identifier) and the applied action (e.g., performance_trace=on, application_log=on, etc), the tracing tool can be activated or deactivated on request. The related supportability infrastructure (e.g., ABAP runtime analysis) is then initiated to proceed with activation or deactivation of the trace for the particular diagnostic identifier. As a result, each tracing layer can be called as soon these fields are imported in the session. Alternatively, the tracing tool evaluates the extended passport after certain events occur (e.g., arrival of a request) and activate or deactivate the traces.

In the activation phase (e.g., HTTP request t), the cookie field "DIAGNOSTIC_ID" with the associated HTTP response is enriched to additional attributes (e.g., performancetrace=on). Additionally, the profile parameter is activated to enable a trace on the server computing device 108 or in the system. With the execution of the HTTP request i+1, the HTTP runtime receives the diagnostic identifier with the assigned attributes. In this example, the extended passport in session (e.g., Web Dynpro session) is extended to item (e.g., DIAGNISTIC_ID=4711) and with the attribute performance_trace=on. The tracing tool is notified as soon as this attribute is set and as a result, the tracing is activated.

After execution of the requests, the traces are written until a request to deactivate is initiated. In the deactivation phase (e.g., HTTP request t+1), the cookie field "DIAGNOSTIC_ID" with the associated HTTP response is enriched to additional attributes (e.g., performance_trace=off). Additionally, the profile parameter for disabling a trace on the server computing device 108 or in the system is deactivated.

Still referring to FIG. 7, with the execution of the request n at 714, the HTTP runtime then receives the diagnostic identifier with assigned attributes (e.g., performance_trace=off). Similarly, the extended passport in the session (e.g., Web Dynpro session) is extended to item (e.g., DIAGNISTI-CID=4711), and with the attribute performance_trace=off. The tracing tool is notified as soon as this attribute is set and therefore, tracing is deactivated. In Web Dynpro (stateful sessions), the response then deletes or replaces the cookie field "DIAGNOSTIC_ID" with the assigned attributes (e.g., performance_trace=off). After execution of requests with the same technique, the traces are written until the deactivation request is initiated.

Figure 8:
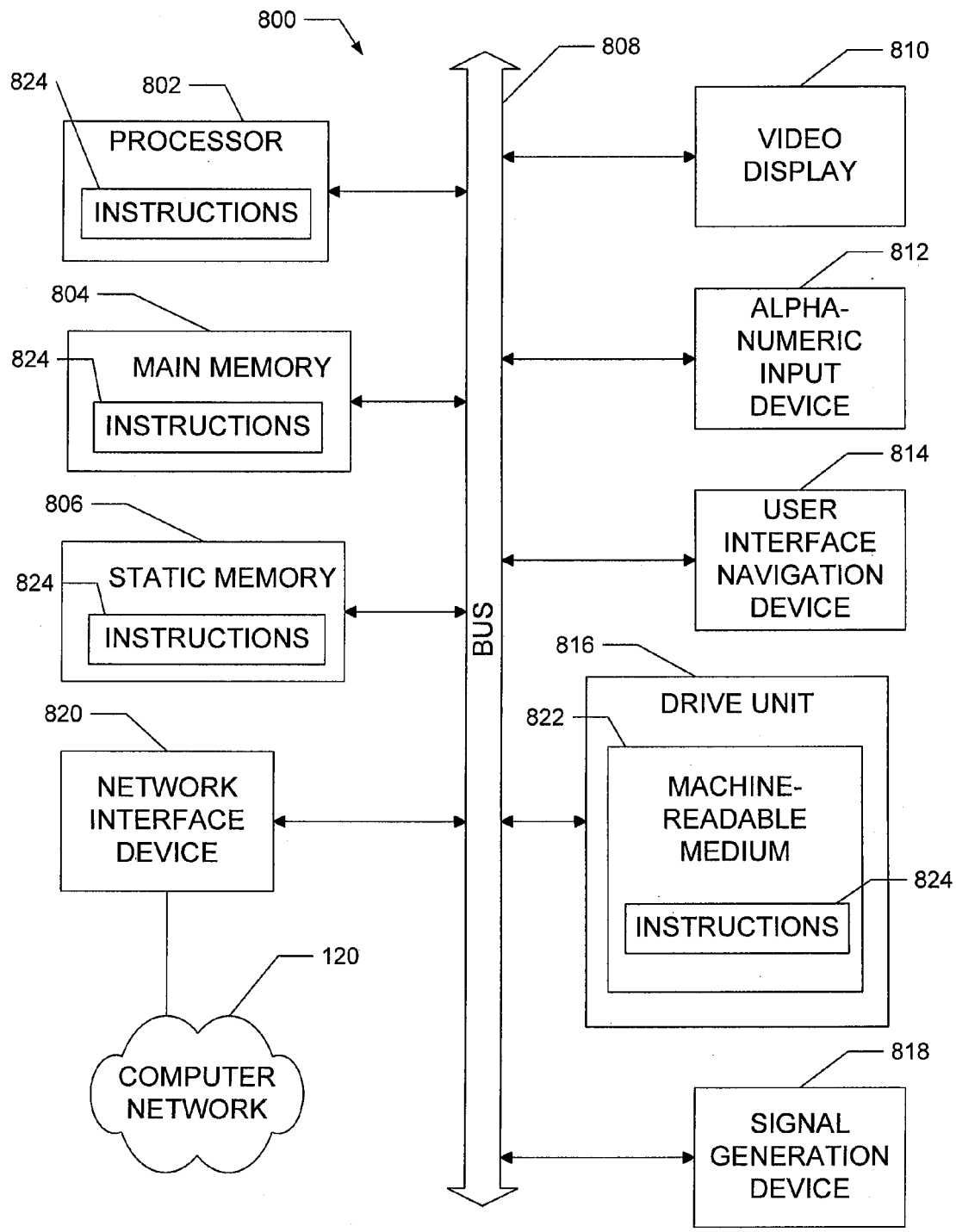
FIG. 8 depicts a block diagram of a machine in the example form of a computing device within which may be executed a set of instructions for causing the machine to perform any one or more of the methodologies discussed herein.

FIG. 8 depicts a block diagram of a machine in the example form of a computing device 800 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server (e.g., server computing device 108 of FIG. 2) or a client machine (e.g., client computing device 102 of FIG. 1) in server-client network environment, or as a peer machine in a peer-to-peer (or distributed) network environment. Embodiments may also, for example, be deployed by Software-as-a-Service (SaaS), Application Service Provider (ASP), or utility computing providers, in addition to being sold or licensed via traditional channels.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 800 includes a processor 802 (e.g., a central processing unit (CPU), a graphics processing unit (GPU) or both), a main memory 804 (e.g., random access memory (a type of volatile memory)), and static memory 806 (e.g., static random access memory (a type of volatile memory)), which communicate with each other via bus 808. The computing device 800 may further include video display unit 810 (e.g., a plasma display, a liquid crystal display (LCD) or a cathode ray tube (CRT)). The computing device 800 also includes an alphanumeric input device 812 (e.g., a keyboard), a user interface (UI) navigation device 814 (e.g., a mouse), a disk drive unit 816, a signal generation device 818 (e.g., a speaker), and a network interface device 820.

The disk drive unit 816 (a type of non-volatile memory storage) includes a machine-readable medium 822 on which is stored one or more sets of data structures and instructions 824 (e.g., software) embodying or utilized by any one or more of the methodologies or functions described herein. The data structures and instructions 824 may also reside, completely or at least partially, within the main memory 804 and/or within the processor 802 during execution thereof by computing device 800, with the main memory 804 and processor 802 also constituting machine-readable, tangible media.

The data structures and instructions 824 may further be transmitted or received over a computer network 120 via network interface device 820 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 800) or one or more hardware modules of a computer system (e.g., a processor 802 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 802 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 802 configured using software, the general-purpose processor 802 may be configured as respective different hardware modules at different times. Software may accordingly configure the general-purpose processor 802, for example, to constitute a particular hardware module at one instance of time and to constitute a different hardware module at a different instance of time.

Modules can provide information to, and receive information from, other hardware modules. For example, the described hardware modules may be regarded as being communicatively coupled. Where multiples of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 802 that are temporarily configured (e.g., by software) or permanently configured to perform the relevant operations. Whether temporarily or permanently configured, such processors 802 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 802 or processor-implemented modules. The performance of certain of the operations may be distributed among the one or more processors 802, not only residing within a single machine, but deployed across a number of machines. In some example embodiments, the processor or processors 802 may be located in a single location (e.g., within a home environment, an office environment or as a server farm), while in other embodiments the processors 802 may be distributed across a number of locations.

While the embodiment(s) is (are) described with reference to various implementations and exploitations, it will be understood that these embodiments are illustrative and that the scope of the embodiment(s) is not limited to them. In general, techniques activating troubleshooting tools may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method of providing a tool used for troubleshooting a component, the tool being included in an application server that is in communication with a plurality of client computing devices, the method comprising:
    receiving a request to activate the tool from at least one client computing device from the plurality of client computing devices, the request including a diagnostic identifier that uniquely identifies the at least one client computing device that transmitted the request;
    activating the tool at the application server based on receipt of the request with the diagnostic identifier used as an input parameter, wherein the tool when activated is adapted to identify the at least one client computing device based on the diagnostic identifier and to provide a functionality associated with the troubleshooting to the at least one client computing device; and
    generating a Uniform Resource Locator (URL) identifying the tool included in the application server.

2. The method of claim 1, further comprising:
    generating the diagnostic identifier;
    encoding the diagnostic identifier into the URL; and
    transmitting the URL to the at least one client computing device,
    wherein the request is based on a selection of the URL.

3. The method of claim 1, further comprising:
    receiving a further request to deactivate the tool from the at least one client computing device; and
    deactivating the tool at the application server.

4. The method of claim 1, wherein the request is a Hypertext Transfer Protocol (HTTP) request and the HTTP request includes a cookie field, and wherein the diagnostic identifier is included in the cookie field.

5. The method of claim 1, wherein the tool is a plug-in tool.

6. The method of claim 1, wherein the application server includes a plurality of different tools used for troubleshooting the component.

7. The method of claim 1, wherein the component is a software component hosted at the application server.

8. The method of claim 1, wherein the tool is a debugger tool.

9. The method of claim 1, wherein the tool is a tracing tool.

10. A server computing device comprising:
   at least one processor; and
   a memory in communication with the at least one processor, the memory being configured to store a plurality of plug-in tools used for troubleshooting a component and a backend troubleshooting framework module that are executable by the at least one processor,
   the backend troubleshooting framework module having instructions that when executed by the at least one processor, cause operations to be performed, the operations comprising:
      receiving a request to activate at least one of the plurality of plug-in tools from a client computing device that is in communication with the server computing device, the request including a diagnostic identifier that uniquely identifies the client computing device that transmitted the request;
      activating the at least one of the plurality of plug-in tools based on receipt of the request with the diagnostic identifier used as an input parameter, wherein the at least one of the plurality of plug-in tools when activated is adapted to identify the client computing device based on the diagnostic identifier and to provide a functionality associated with the troubleshooting of the component to the client computing device; and
      generating a Uniform Resource Locator (URL) identifying the at least one of the plurality of plug-in tools.

11. The server computing device of claim 10, wherein the backend troubleshooting framework module is adapted to interface with the plurality of plug-in tools.

12. The server computing device of claim 10, wherein the memory is further configured to store an application programming interface, and wherein the functionality is provided to the client computing device by way of the application programming interface.

13. The server computing device of claim 10, wherein the memory is further configured to store a backend user interface framework module, and wherein the functionality is provided to the client computing device by way of the backend user interface framework module.

14. The server computing device of claim 10, wherein the operations further comprise:
   transmitting the URL to the client computing device,
   wherein the request is based on a selection of the URL.

15. A non-transitory, machine-readable medium that stores instructions, which, when performed by a machine, cause the machine to perform operations comprising:
   receiving a request to activate a troubleshooting tool from at least one client computing device from a plurality of computing devices, the request including a diagnostic identifier that uniquely identifies the at least one client computing device that transmitted the request, the troubleshooting tool being included in an application server that is in communication with the plurality of client computing devices;
   activating the troubleshooting tool at the application server based on receipt of the request with the diagnostic identifier used as an input parameter, wherein the troubleshooting tool when activated is adapted to identify the at least one client computing device based on the diagnostic identifier and to provide a functionality associated with the troubleshooting tool to the at least one client computing device; and
   generating a Uniform Resource Locator (URL) identifying the troubleshooting tool included in the application server.

16. The non-transitory, machine-readable medium of claim 15, further comprising:
   transmitting the URL to the client computing device,
   wherein the request is based on a selection of the URL.

17. The non-transitory, machine-readable medium of claim 15, wherein the request is a Hypertext Transfer Protocol (HTTP) request and the HTTP request includes a cookie field, and wherein the diagnostic identifier is included in the cookie field.

18. The non-transitory, machine-readable medium of claim 15, wherein the request further includes logon information, and wherein the operations further comprises identifying a permission of a user of the computing device to activate the troubleshooting tool based on the logon information.

19. The non-transitory, machine-readable medium of claim 15, wherein the application server includes a plurality of different troubleshooting tools.

20. The non-transitory, machine-readable medium of claim 15, wherein the troubleshooting tool is used for troubleshooting a hardware component.

* * * * *